United States Patent [19]
Davis et al.

[11] Patent Number: 6,049,879
[45] Date of Patent: Apr. 11, 2000

[54] POWER MANAGEMENT DIAGNOSTIC IN ELECTRONIC DEVICES

[75] Inventors: Edward L. Davis, Milwaukie, Oreg.; Sadashivaish Shiva, Puyallup, Wash.

[73] Assignee: Intel Corporation, Santa Clara, Calif.

[21] Appl. No.: 08/982,580

[22] Filed: Dec. 2, 1997

[51] Int. Cl.[7] .................................................. G06F 1/32
[52] U.S. Cl. ........................................ 713/300; 713/324
[58] Field of Search .................................. 713/300–330

[56] References Cited

U.S. PATENT DOCUMENTS

| | | | |
|---|---|---|---|
| 5,557,557 | 9/1996 | Frantz et al. | 395/750 |
| 5,724,591 | 3/1998 | Hara et al. | 395/750 |
| 5,809,316 | 9/1998 | Gouzu | 395/750 |

*Primary Examiner*—Ayaz R. Sheikh
*Assistant Examiner*—David A. Wiley

[57] ABSTRACT

Diagnostic to identify power consumption of devices present on a target terminal. In either an automatic or manual mode, the target terminal sets the devices to operate at defined power levels and measures the power consumption of the device at that level. The target terminal reports the power consumption to a master terminal. The diagnostic permits system operators to identify failing devices or drivers from a central, master terminal 100. In a monitoring mode, the present invention permits a system operator to audit power state changes of devices in a target terminal 200 during normal operation. By following each event in the monitoring mode, a system operator may identify possibly inconsistent power management techniques in two or more applications running on the target terminal.

31 Claims, 6 Drawing Sheets

POWER MANAGEMENT DIAGNOSTIC IN ELECTRONIC DEVICES

BACKGROUND OF THE INVENTION

1. Field of the Invention

The present invention relates to power management systems incorporated into electronic devices such as computers, workstations and network servers.

2. Related Art

Electronic devices are now the subject of energy conservation programs in both the United States and abroad whose goal is to reduce power consumed by such devices. Fully powered computers consume from 60 to 200 watts of power. Such programs may require the computers to limit their power consumption to about 5 watts, as a representative example. To meet the energy consumption requirements of such standards, computers and other electronic devices have begun to incorporate power management techniques. Power management balances two competing goals: First, power management conserves electrical energy while a computer is idle; second, it maintains the computer ready to respond to user requests or external events, such as incoming signaling from a network or from a telephone line. Typically, power management and control are performed by operating system ("OS") software resident within a computer. Applications, computer programs and device drivers influence decisions made by the OS.

"Devices" include disk drives, modems, monitors and other computer components that may be configured to operate at one or more power states. Typically, the power states include a fully powered state, an unpowered state and one or more intermediate power states. Although each power state defines the power consumed by the device, it also affects the device's performance.

Consider a hard disk drive as an example. Relative to other memories within a conventional personal computer, a hard disk drive is used infrequently; typically it is accessed for storage of data that is too large to fit within random access memory or for storage of data that is used infrequently. Access time, measured from the time that a computer's central processor demands data from the drive to the time the drive furnishes the data, is a key performance characteristic of hard drives. The access time ideally should be as short as possible.

Hard drives store information on platters provided within the drive. The platters spin under magnetic heads at a predetermined rate. The heads read the information from the platters. To minimize the access time, the drives typically maintain the platters spinning at the predetermined rate; however, the drive must be energized to keep the platters spinning. While it may be preferable to maintain the drive unpowered to meet the requirements of an energy conservation program, doing so greatly impairs performance of the drive by increasing its access time.

Accordingly, applications and device drivers for electronic devices must incorporate power management techniques that balance performance requirements against the requirements of energy conservation programs. The applications will interface with device drivers and an operating system provided on the computer to implement the power management techniques. And, when several applications run on a computer at once, power management techniques of one application may conflict with another.

To meet the requirements of the energy conservation programs, a computer must include a reliable power management system. However, power management decisions may be made by applications, device drivers, BIOS and the OS. Some decisions of an application, for example, may conflict with decisions made by another. Identification and debugging of such conflicts cannot be made without a diagnostic to monitor the power states of the devices and to determine when devices change power states and to determine which of the applications, device drivers, BIOS or OS cause the device to change power states.

Energy conservation programs may require periodic audits of a computer to determine whether the computer consumes power at a rate that is permitted under the program. Accordingly, there is a need in the art for a power management diagnostic that polices computers for compliance with energy management programs. There is a need in the art for such a system that monitors power consumption of specific devices within an electronic device at specified power levels.

SUMMARY OF THE INVENTION

An embodiment of the present invention provides a diagnostic method for power management systems that identifies devices on an electronic device that may be set to multiple power settings, and, for each device, changes the power setting of the device and measures a change in power consumption caused thereby.

BRIEF DESCRIPTION OF THE DRAWINGS

FIG. 6(*b*) illustrates a second power measuring apparatus of the present invention.

DETAILED DESCRIPTION

Figure 1:
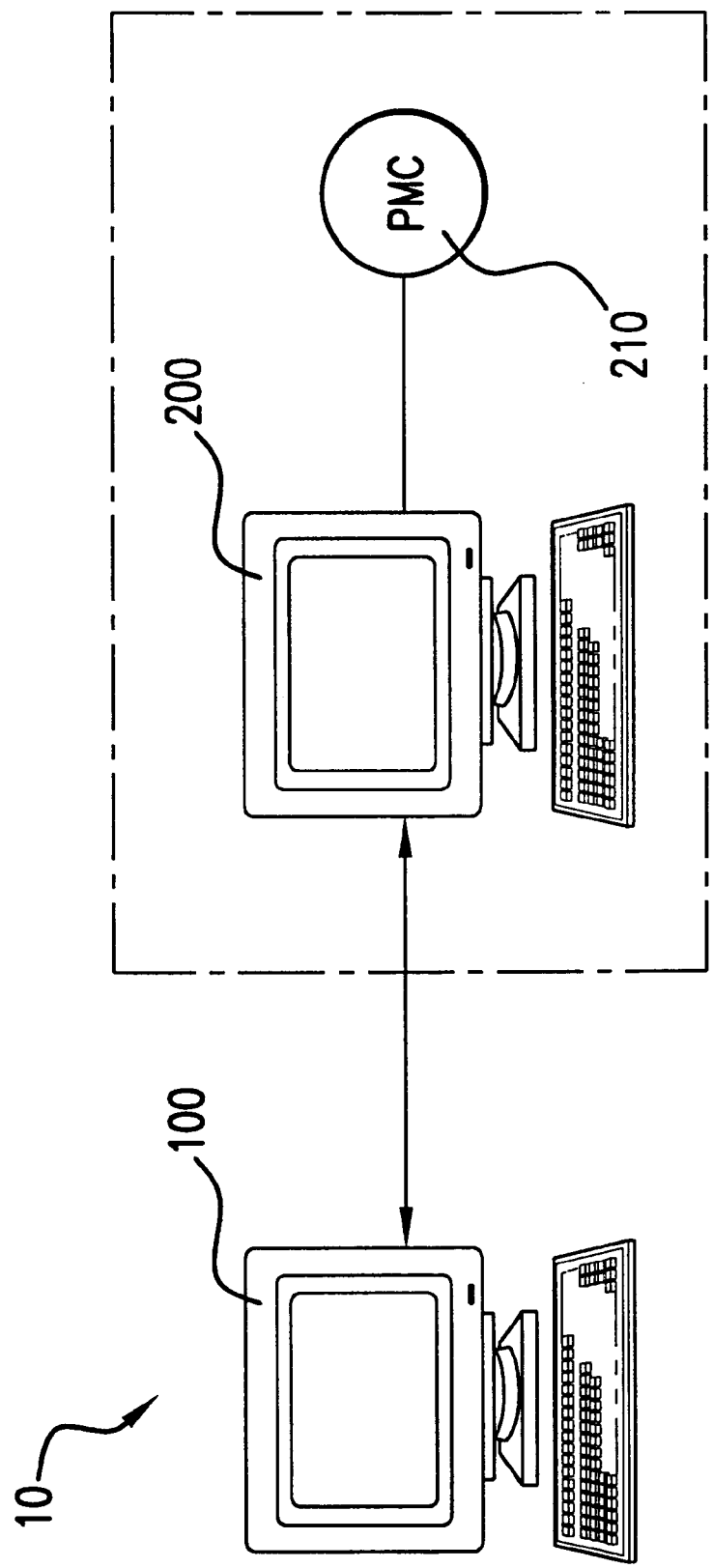
FIG. 1 illustrates a system constructed in accordance with the present invention.

Turning now to FIG. 1, there is shown a computer system constructed according to an embodiment of the present invention. A master terminal 100 coordinates the diagnostics of the present invention with a target terminal 200. Although the master and target terminals 100 and 200 are illustrated as desktop computers in FIG. 1, it should be understood that the present invention finds application in any kind of electronic device having devices operable at more than one power state. The master terminal 100 communicates with the target terminal 200 over an interface, which may be a network, parallel, serial, modem or other conventional connection.

The target terminal 200 possesses a power measuring circuit ("PMC") 210 that measures power output by a power supply (not shown) of the target terminal 200. Although the PMC 210 is shown external to the target terminal 200, the PMC 210 may be internal or external to the target terminal 200 as discussed herein. The PMC 210 provides the target terminal 200 with power consumption information over a second connection.

Figure 2:
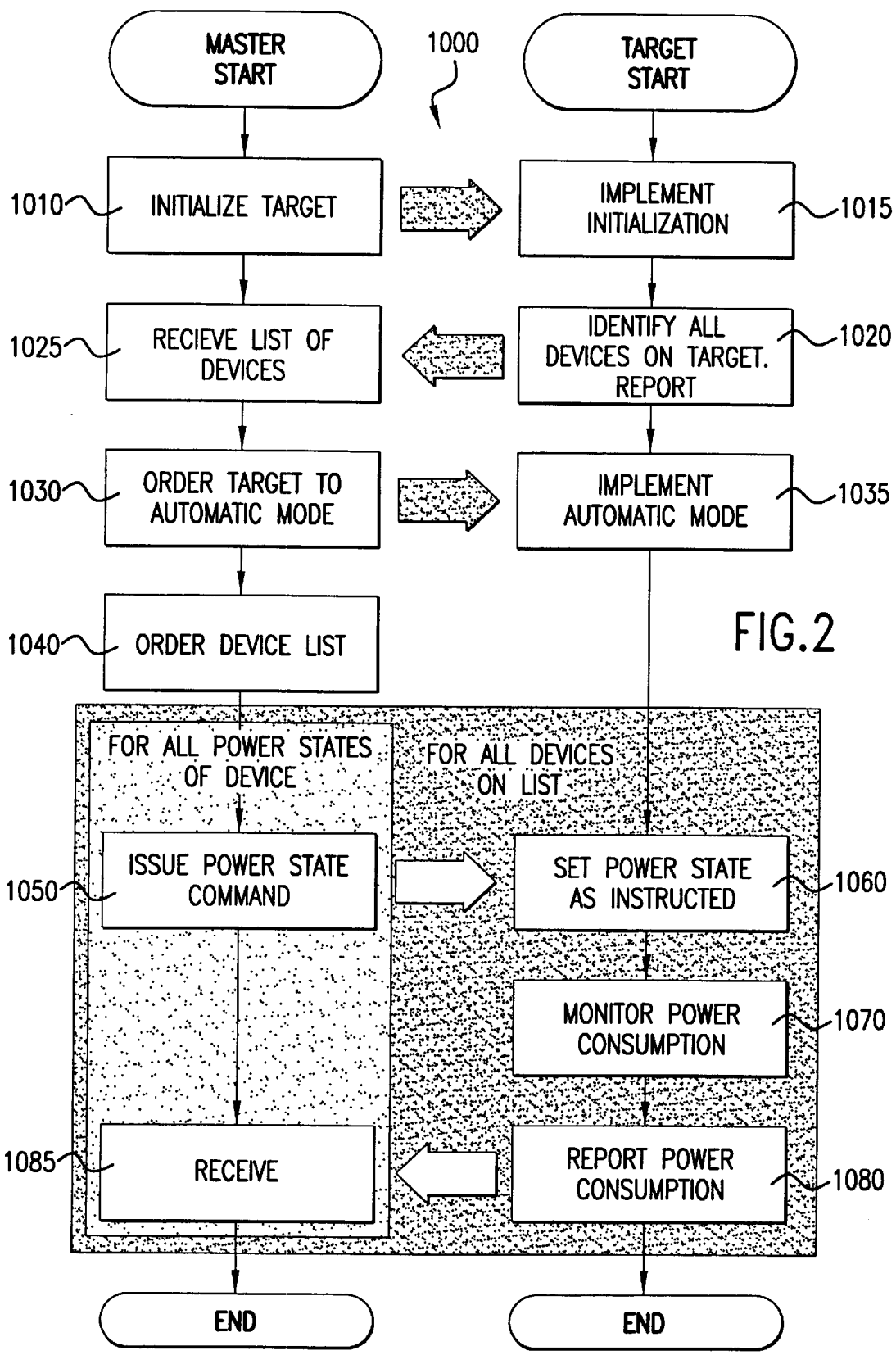
FIG. 2 illustrates a diagnostic method operating in an automatic mode.

FIG. 2 illustrates one embodiment of a method of operation 1000 for the master and target terminals 100 and 200 according to the diagnostic system. This first method is an automatic diagnostic mode. As a first step, the master terminal 100 initializes the target terminal 200 (Step 1010). For example, the master terminal 100 may provide the target terminal 200 with all necessary functionality to implement the method. Typically, drivers are downloaded to the target terminal 200 to interface with the target's operating system and change power states of individual devices within. Also, the master terminal 100 may query the target terminal 200 to determine whether the terminal 200 possesses sufficient available resources to execute the method. The target terminal 200 receives the initialization information (Step 1015) and may acknowledge it. The driver may be removed from the target upon successful execution of the automatic diagnostic method.

The target terminal 200 identifies all devices present thereon (Step 1020). It interfaces with the operating system's configuration manager to identify the devices. When the identification step is completed, the target terminal 200 provides the master system with a "list" of devices. The master terminal 100 receives the device list at step 1025.

The master terminal 100 commands the target terminal 200 to enter the "automatic mode" for diagnostics (Step 1030). The terminal 200 receives and implements the command (Step 1035). Typically, the target terminal 200 acknowledges the command (step not shown).

Based on the list of devices provided by the target terminal 200, the master terminal 100 arranges the device list in an order for testing (Step 1040). The device list may be ordered to represent an order for powering down the devices. In this instance, the master terminal 100 orders the devices so that child devices will be powered down before parent devices. For the purposes of this discussion, a "parent" device is one that, when powered down, powers down other devices. Those other devices are the parent's "children."

The master terminal 100 steps through the arranged device list. For each device, the master terminal 100 issues a set power command (Step 1050). The command identifies a power state that the target terminal 200 must establish for the identified device. The master terminal 100 then waits for a power consumption report from the target terminal 200.

In response to each set power command, the target terminal 200 places the identified device at the specified power level (Step 1060). The target terminal 200 monitors power consumption of the device (Step 1070). Once a measurement of power consumption is made, the target terminal 200 reports the measurement to the master terminal 100 (Step 1080). The master terminal 100 receives the report at step 1085.

When the target terminal 200 measures power consumption, it reads power consumption from the PMC 210. Typically, the target terminal 200 measures a change in power consumption that occurs when one of its devices is set to a new power level. The PMC 210 typically is connected directly to the power supply rather than the individual devices.

During the measurement of power consumption, other terminal devices may or may not be powered. When the target terminal 200 establishes a new power state for the device as instructed in the set power command, all other devices are maintained at the power states at which they were operating before receipt of the set power command. Thus, the change in power consumption should occur solely as a result of a change in power state.

However, in an alternate embodiment, the target terminal 200 may set all devices to their lowest power setting in response to the master terminal's command to enter the automatic mode. In this alternative, in response to the set power command, the target terminal 200 brings the selected device from an unpowered state to the state identified in the command. Again, the PMC 210 measures a change in power consumption at the terminal in response to the state change. Once the target has completed the report, the target may bring the device back down to its lowest power setting (step not shown).

The automatic diagnostic method may step each device within the target terminal 200 through all possible power states specific to that device. Thus, if a target terminal 200 display monitor operates at four different power settings, the master terminal 100 may order the target terminal 200 to step sequentially through all four settings and measure how power consumption changes for each setting.

In an environment where communication bandwidth is limited, the communication between the master terminal 100 and the target terminal 200 may be reduced. At step 1030 in this alternate embodiment, the master terminal 100 may identify a list of devices and power settings to be established by the target 200. Then, the target terminal 200 may loop through steps 1060–1080 as instructed, setting power states and gathering power consumption data as described above. At the conclusion of the last sequence through steps 1060–1080, the target terminal 200 may issue a single message containing the measurement data observed for each entry of the list provided by the master terminal 100 in step 1030. This embodiment reduces communications exchanged between the master terminal 100 and the target terminal 200.

In another embodiment, the automatic diagnostic method may be implemented on a single terminal acting as both the master and target terminals. In this alternative, shown in FIG. 3, the terminal is loaded with necessary drivers to change power states of the devices. Once the drivers are loaded however, the single computer may step through the automatic diagnostic method to identify all devices within (Step 2010) and order the devices for power down (Step 2020). The terminal steps through devices in order to set power states (Step 2030) and monitor power consumption in the devices (Step 2040).

Figure 4:
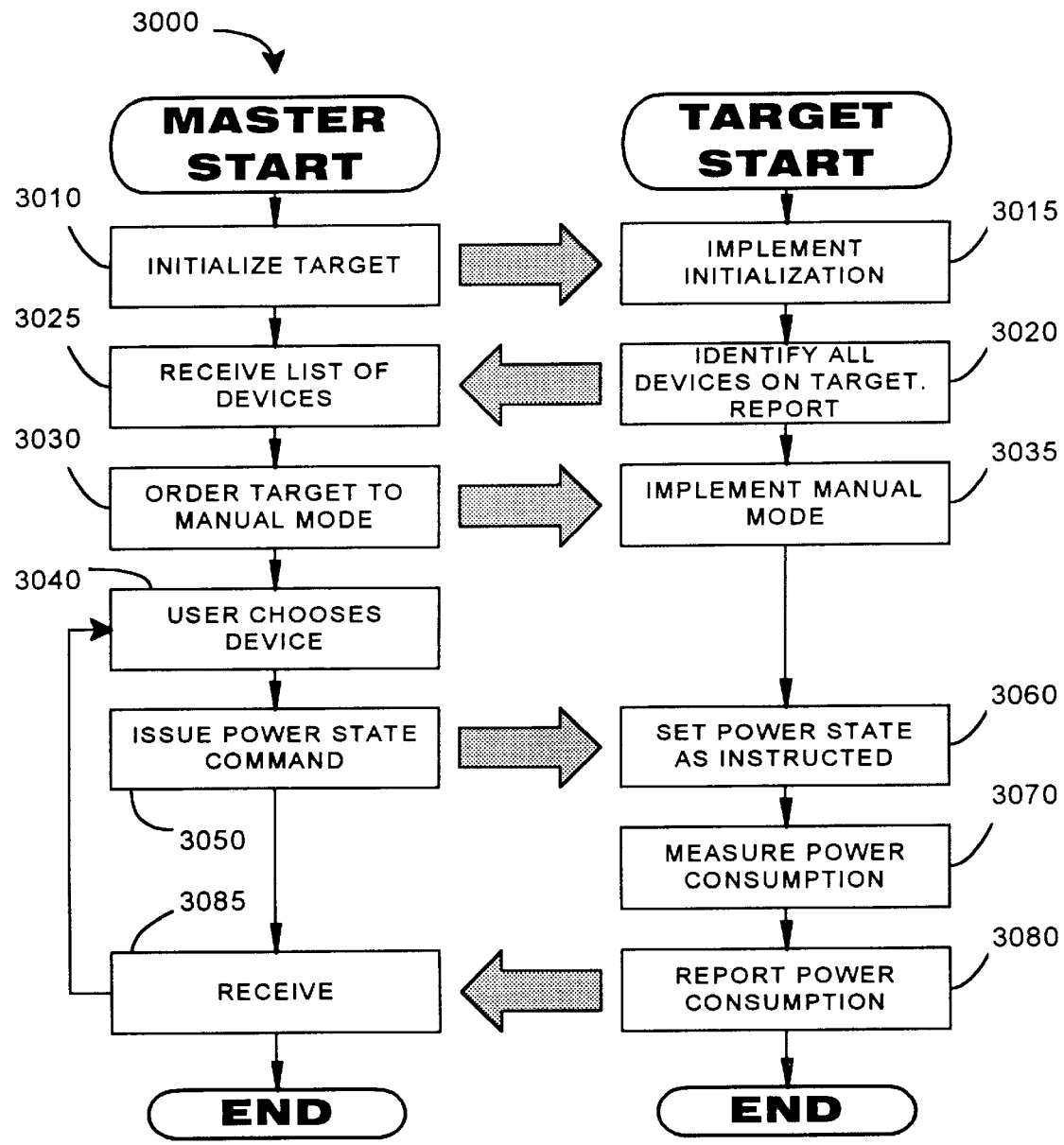
FIG. 4 illustrates a diagnostic method operating in a manual mode.

A manual mode 3000 of the diagnostic method is shown in FIG. 4. As with the automatic mode, in this embodiment the master terminal 100 initializes the target terminal 200 (Steps 3010 and 3015), providing necessary drivers for the target to implement the diagnostic method. The target terminal 200 identifies all devices thereon and provides the master terminal 100 with a list of the devices (Steps 3020 and 3025). Also, the master terminal 100 commands the target terminal 200 to enter a manual mode of operation (Steps 3030 and 3035).

In the manual mode, a system operator at the master terminal 100 may select devices for testing. The user identifies the device at the master terminal 100 (Step 3040). Once identified, the master terminal 100 generates a set power command as in the automatic mode, commanding the target terminal 200 to set a specific device to a desired power level (Step 3050).

The target terminal 200 receives the command and executes it, setting the device to the required power level (Step 3060). The target terminal 200 measures power consumption effected by the change in the device's power level (Step 3070) and reports the power consumption to the master terminal 100 (Step 3080). As with the automatic mode, the target terminal 200 may measure power consumption with other devices remaining in whatever powered state they were in when the manual method first began or after first setting the other devices into an unpowered state. In the latter alternative, the target terminal 200 sets all devices to an unpowered state as part of step 3035.

The master terminal 100 receives the power consumption data from the target terminal 200 (Step 3085). The master terminal 100 may return to step 2040 for further diagnostics by the system operator.

Figure 5:
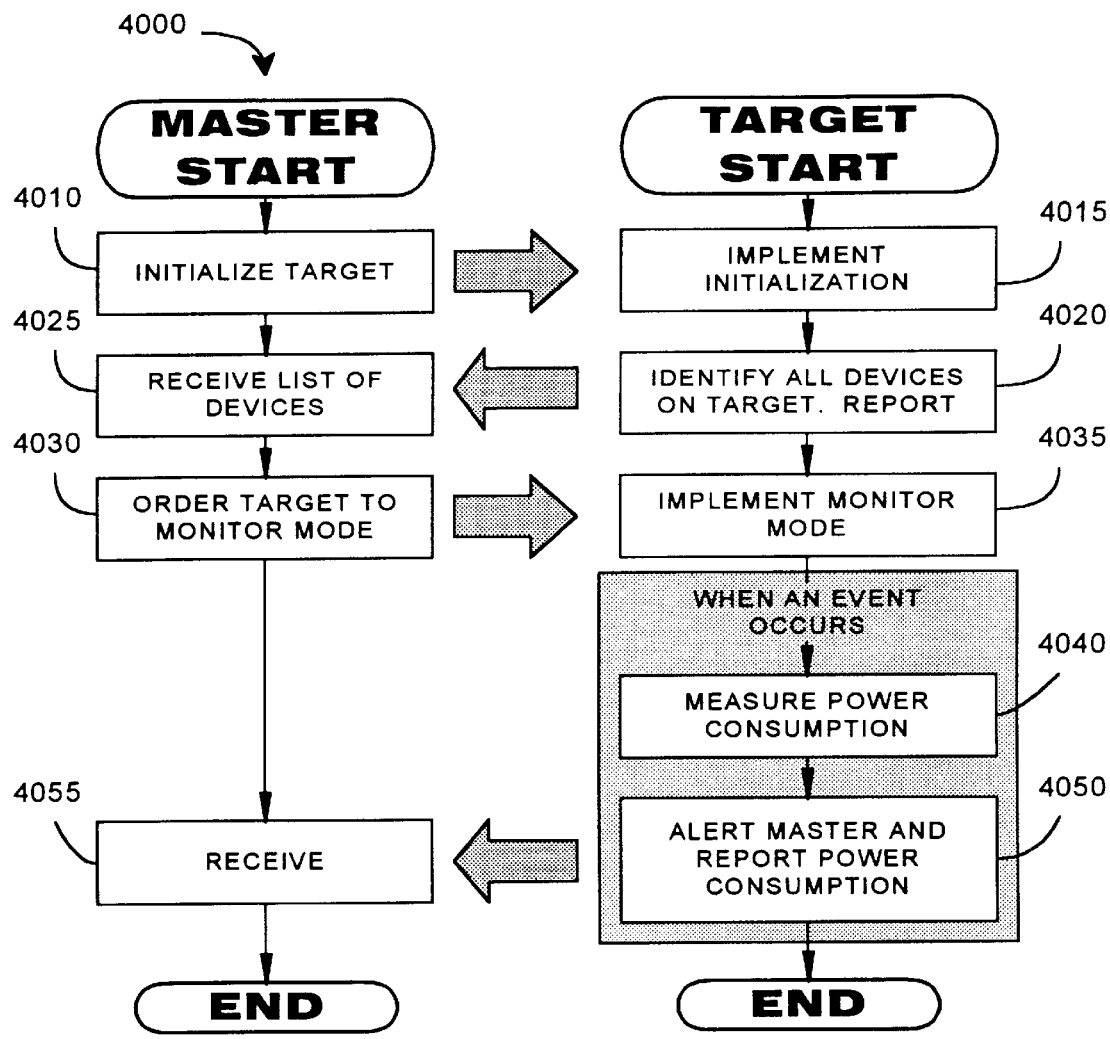
FIG. 5 illustrates a diagnostic method operating in a monitoring mode.

An embodiment of a monitor mode 4000 of the diagnostic method is shown in FIG. 5. In this mode, initialization occurs as in the automatic and manual modes described above (Steps 4010 and 4015). Also, the target terminal 200 inventories devices and provides the master terminal 100 with a device list (Steps 4020 and 4025).

The master terminal 100 commands the target terminal 200 to enter a monitoring mode (Steps 4030 and 4035). In this mode, the target terminal 200 monitors applications and device drivers to determine when they cause changes in the power states of any device. When a power change occurs in any device within the target terminal 200, it is an "event."

Upon each event, the target terminal 200 measures power consumption of the terminal (Step 4040). The target terminal 200 generates an alert message to the master terminal 100, reporting the power consumption to the master terminal 100 (Steps 4050 and 4055). The alert message contains information on the device that changed power state, the new power state of the device and the power consumption that the change affected. Preferably, the alert message identifies which application, device manager or operating system caused the power state change. The target terminal 200 then waits for the next event to occur.

Figure 6A:
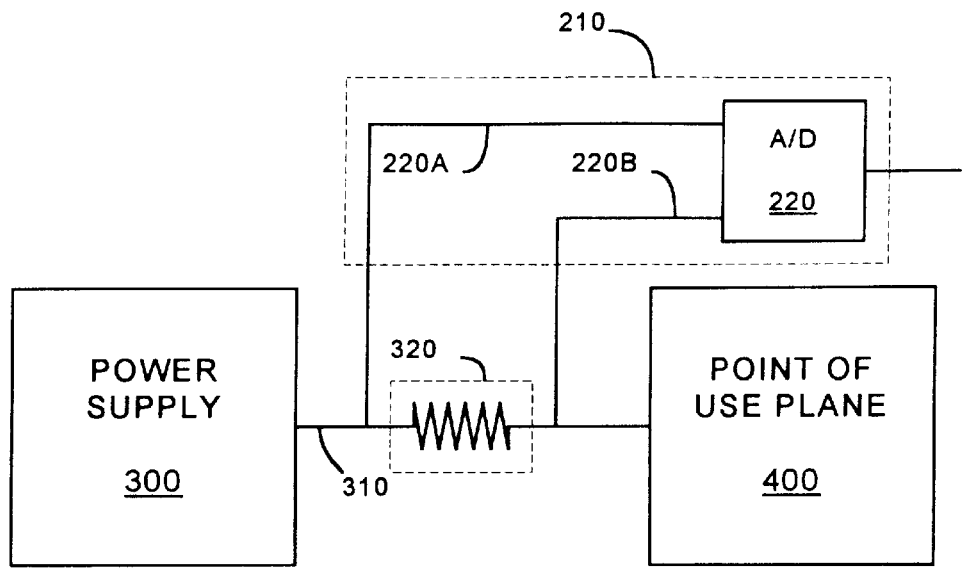
FIG. 6(*a*) illustrates a first power measuring apparatus of the present invention.

The target terminal 200 may monitor power consumption through one or more of the PMCs 210 of the present invention. A first PMC 210A is shown in FIG. 6(a). In this embodiment, two leads 220A, B from an analog to digital converter 220 ("A/D") are coupled to an output 310 from the power supply 300. The leads 220A, B are separated along the power supply output 310. The A/D 220 measures a potential drop across the resistance present in the output 310 itself. At higher output power levels, a higher voltage level will be detected by the A/D 220 than at lower output power levels. The output of the A/D 220 is detected by the target terminal 200.

Figure 6B:
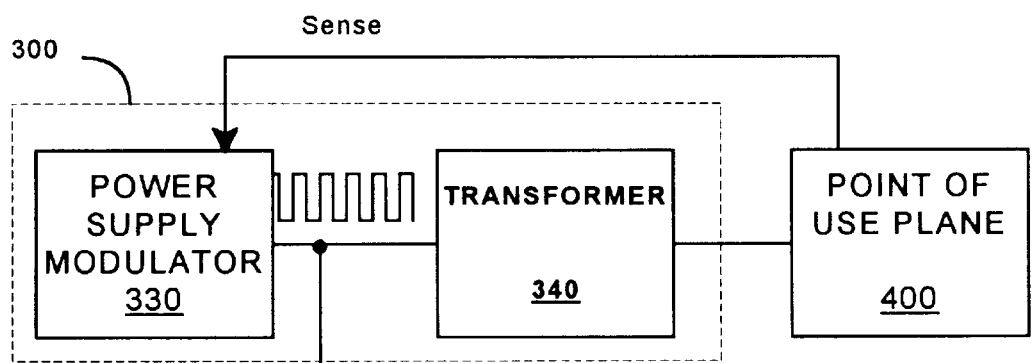
Figure 6B:
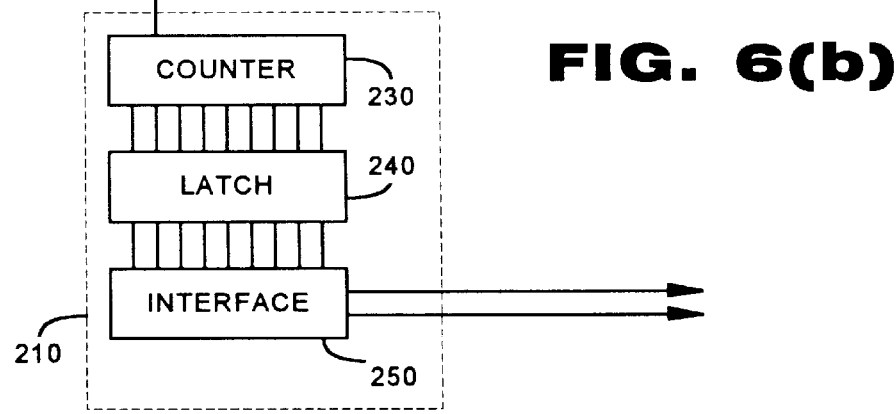

A second embodiment of a PMC 210B is shown in FIG. 6(b). In this configuration, a power supply modulator 300 modifies the duty cycle of a transformer 330 to modulate the level of power generated by the power supply 300. The power supply modulator 330 generates a binary modulation signal having a period that reflects the power to be output by the power supply.

The PMC 210 of FIG. 6(b) includes a counter 230, a latch 240 and an interface 250. The modulation signal is input to the counter 230. The counter 230 increments for each low to high or high to low transition of the modulation signal. The count maintained by the counter 230 indicates the duty cycle of the modulation signal, which is representative of the power generated by the power supply.

The latch 240 and the interface 250 permit the target terminal 200 to read the count out of the PMC 210. The latch 240 buffers the count and the interface 250 places the parallel output of the latch on an internal two wire bus conventional to many electronic devices.

Figure 3:
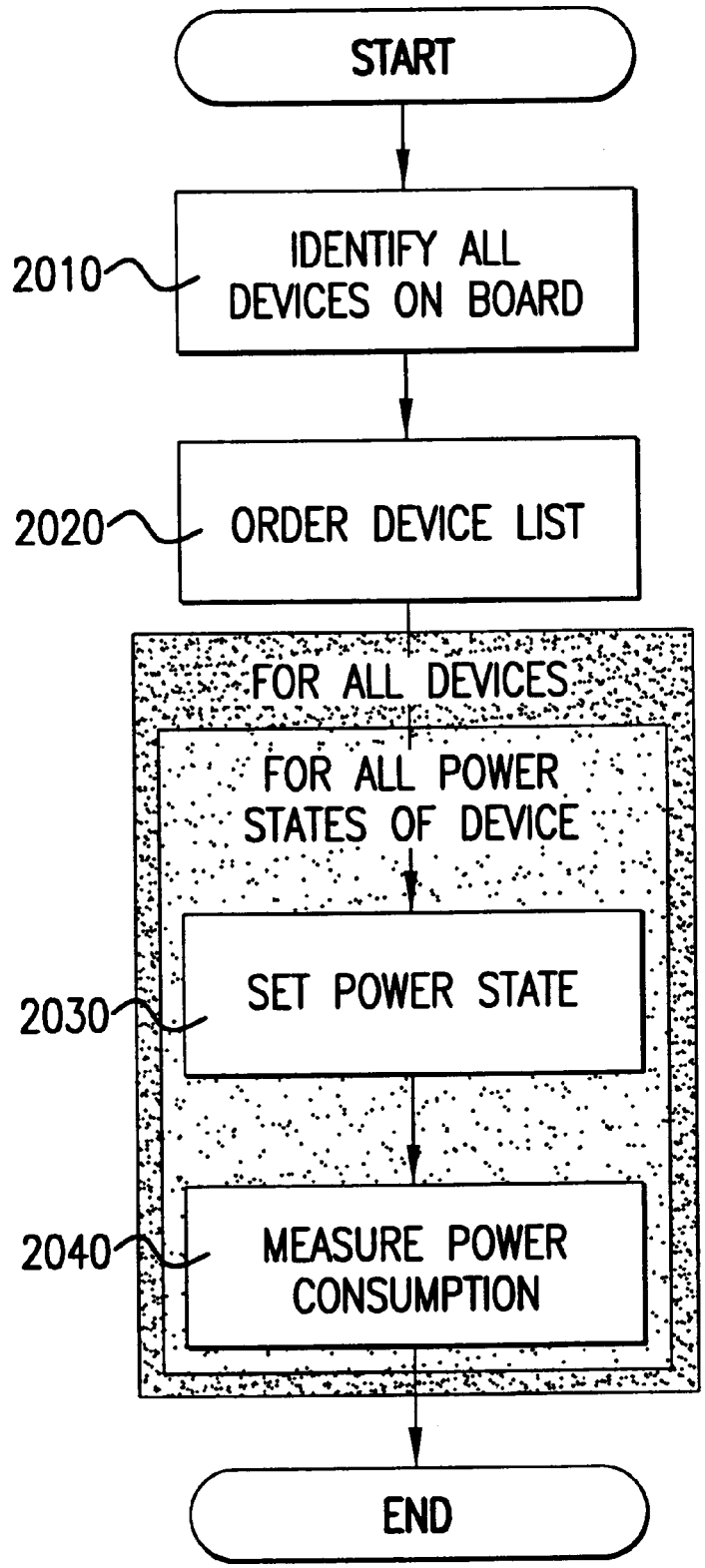
FIG. 3 illustrates a diagnostic method operating in an automatic mode.

In a third embodiment, the PMC 210 may be a commercially available watt meter tied to the power supply, such as the model no. 2101 commercially available from Valhalla Scientific, Inc. of San Diego, Calif. The watt meter outputs a digital signal to the target terminal 200 over a serial or other conventional interface. Alternatively, the watt meter may be read directly by the master terminal 100. To measure the power consumption of the device, the target terminal 200 queries the watt meter and reads in the digital signal. Alternatively, the master terminal 100 may query the watt meter over a second interface; in this instance, the target terminal 200 would not report the power consumption as shown in FIGS. 2–4.

As described, the present invention provides various embodiments of a diagnostic that identifies power consumption of devices within a target terminal 200. In either the automatic or manual mode, the target terminal 200 sets specific devices to defined power levels and measures the power consumption of the device at that level. This technique permits system operators to identify failing devices or drivers from a central, master terminal 100. Further, in the monitoring mode, the illustrated embodiment permits a system operator to audit power state changes of devices in a target terminal 200 during normal operation. By following each event in the monitoring mode, a system operator may identify possibly inconsistent power management techniques in two or more applications.

The methods shown may be used during manufacture to qualify devices of the computer. By implementing the diagnostic method of FIG. 2, for example, the master terminal 100 may record power consumption of every device on a target terminal 200 at every power level. A report may be generated based on the data acquired by the master terminal. By comparing the report of actual power consumption of the devices against power levels specified in specifications for the devices, the present invention can be used to certify a computer as energy compliant very quickly.

Several embodiments of the present invention are specifically illustrated and described herein. However, it will be appreciated that modifications and variations of the present invention are covered by the above teachings and within the preview of the appended claims without departing from the spirit and intended scope of the invention.

We claim:

1. A power management diagnostic method, comprising the steps of, at a target terminal:
    identifying devices on the target terminal that may be set to multiple power settings,
    creating a list of the devices,
    changing the power setting of at least one of said devices based upon the device's position on the list, and
    measuring a change in power consumption caused by the changing step.

2. The method of claim 1, further comprising steps of, subsequent to the identifying step:
    in a system including parent and children devices,
    ordering the list to represent an order for powering down the devices, wherein children devices are ordered for power down before parent devices of children devices.

3. The method of claim 1, wherein the changing step changes the power of the device from a powered state to an unpowered state.

4. The method of claim 1, further comprising a step of, before the first occurrence of the changing step, setting the power setting of every device to an unpowered state.

5. The method of claim 1, wherein the measuring step is performed by measuring a change in power consumption of the entire device caused by the changing step.

6. The method of claim 1, wherein the changing and measuring steps are repeated for every power setting supported by the respective device.

7. A power management diagnostic method, comprising the steps of:
   initializing a target terminal,
   identifying devices on the target terminal that support multiple power sittings,
   creating a list of the devices,
   setting one of the devices to a predetermined power setting based upon its position in the list,
   monitoring power consumption caused by the setting step, and
   reporting the power consumption.

8. The diagnostic method of claim 7, wherein the initializing step includes a step of loading device drivers on the target terminal that permit the target to set the power settings of the devices on command.

9. The diagnostic method of claim 7, wherein the initializing step includes a step of querying the target terminal to determine its availability to execute the diagnostic method.

10. The diagnostic method of claim 7, wherein the initializing step is performed by a master terminal.

11. The diagnostic method of claim 7, further comprising, before the first occurrence of the setting step, a step of commanding the target terminal to enter an automatic mode.

12. The diagnostic method of claim 11, wherein the commanding step includes a step of commanding the target terminal to power down all devices.

13. The diagnostic method of claim 12, wherein the predetermined power settings are powered states for the devices.

14. The diagnostic method of claim 7, wherein the setting step includes a step of commanding the target terminal to set the power setting of the device to the predetermined power setting.

15. The diagnostic method of claim 7, wherein the reporting step includes a step of reporting the power consumption to a master terminal.

16. A power management diagnostic method, comprising the steps of:
   initializing a target terminal,
   identifying all devices on the target terminal that support multiple power settings,
   creating a list of the devices,
   outputting the list to user,
   receiving a device selection from the user,
   setting the selected device to a predetermined power setting,
   monitoring power consumption caused by the setting step, and
   reporting the power consumption.

17. The diagnostic method of claim 16, wherein the initializing step includes a step of loading device drivers on the target terminal that permit the target to set the power settings of the devices on command.

18. The diagnostic method of claim 16, wherein the initializing step includes a step of querying the target terminal to determine its availability to execute the diagnostic method.

19. The diagnostic method of claim 16, wherein the initializing step is performed by a master terminal.

20. The diagnostic method of claim 16, further comprising, before the first occurrence of the setting step, a step of commanding the target terminal to enter a manual mode.

21. The diagnostic method of claim 20, wherein the commanding step includes a step of commanding the target terminal to power down all devices.

22. The diagnostic method of claim 21, wherein the predetermined power settings are powered states for the devices.

23. The diagnostic method of claim 16, wherein the setting step includes a step of commanding the target terminal to set the power setting of the device to the predetermined power setting.

24. The diagnostic method of claim 16, wherein the reporting step includes a step of reporting the power consumption to a master terminal.

25. A power management diagnostic method, comprising the steps of:
   identifying at least one device on a target terminal that supports multiple power settings; and
   in response to an event that changes a power setting of one of said devices;
   monitoring a change in power consumption caused by the event, and
   transmitting from the target terminal, a report of the change in power consumption.

26. The diagnostic method of claim 25, further comprising a step of initializing the target terminal before the identifying step.

27. The diagnostic method of claim 26, wherein the initializing step includes a step of querying the target terminal to determine its availability to execute the diagnostic method.

28. The diagnostic method of claim 25, further comprising, before the first occurrence of an event, a step of commanding the target terminal to enter a manual mode.

29. A computer readable medium containing program instructions that, when loaded into a processor, cause the processor to perform the steps of:
   identifying devices in communication with the processor that may be set to multiple power settings,
   creating a list of the devices,
   changing the power setting of at least one of said devices based on its position in the list, and
   measuring a change in power consumption caused by the changing step.

30. A computer readable medium containing program instructions that, when loaded into a target terminal, cause the target terminal to perform the steps of:
   identifying all devices on the target terminal that support multiple power settings
   creating a list of the devices,
   outputting the list of a user,
   receiving a device selection from the user,
   setting the selected device to a predetermined power setting,
   monitoring power consumption caused by the setting step, and
   reporting the power consumption.

31. A computer readable medium containing program instructions that, when loaded into a target terminal, cause the target terminal to perform the steps of:
   identifying at least one device on the target terminal that supports multiple power settings; and
   in response to an event that changes a power setting of one of said devices;
   monitoring a change in power consumption caused by the event, and
   transmitting, from the target terminal, a report of the change in power consumption.

* * * * *

UNITED STATES PATENT AND TRADEMARK OFFICE
CERTIFICATE OF CORRECTION

PATENT NO. : 6,049,879
DATED : April 11, 2000
INVENTOR(S) : DAVIS et al

It is certified that error appears in the above-indentified patent and that said Letters Patent is hereby corrected as shown below:

| Column | Line | |
|---|---|---|
| 5 | 66 | please change "model no." to --Model No.--. |
| 6 | 37 | please change "preview" to --purview--. |
| 7 | 5 | please change "sittings" to --settings--. (claim 7) |
| 8 | 44 | after "settings" insert -- , -- (a comma). (claim 30) |

Signed and Sealed this

Tenth Day of April, 2001

Attest:

NICHOLAS P. GODICI

Attesting Officer     Acting Director of the United States Patent and Trademark Office